(12) United States Patent
Smith et al.

(10) Patent No.: US 11,358,089 B2
(45) Date of Patent: *Jun. 14, 2022

(54) SNAP IN PLACE NATURAL GAS FILTER

(71) Applicant: CUMMINS FILTRATION IP, INC., Columbus, IN (US)

(72) Inventors: Bradley A. Smith, Columbus, IN (US); Chirag D. Parikh, Madison, WI (US); Brian K. Wagner, Stoughton, WI (US); Scott Manke, Sun Prairie, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 385 days.

This patent is subject to a terminal disclaimer.

(21) Appl. No.: 16/033,729

(22) Filed: Jul. 12, 2018

(65) Prior Publication Data
US 2018/0326342 A1 Nov. 15, 2018

Related U.S. Application Data

(63) Continuation of application No. 15/301,220, filed as application No. PCT/US2015/023086 on Mar. 27, 2015, now Pat. No. 10,046,263.
(Continued)

(51) Int. Cl.
*B01D 46/24* (2006.01)
*B01D 46/00* (2022.01)

(52) U.S. Cl.
CPC ..... *B01D 46/2414* (2013.01); *B01D 46/0005* (2013.01); *B01D 46/0031* (2013.01); *B01D 2265/028* (2013.01); *B01D 2265/029* (2013.01)

(58) Field of Classification Search
None
See application file for complete search history.

(56) References Cited

U.S. PATENT DOCUMENTS 3,232,437 A * 2/1966 Hultgren ............ B01D 27/103
210/440
4,204,960 A * 5/1980 Sugiyama ............ B01D 29/111
210/232
(Continued)

FOREIGN PATENT DOCUMENTS

CN 1568412 A 1/2005
CN 101977666 A 2/2011
(Continued)

OTHER PUBLICATIONS

Third Office Action and Search Report issued for Chinese Patent Application No. 201580016537X, dated Mar. 4, 2019, including English translation, 23 pages.
(Continued)

*Primary Examiner* — Christopher P Jones
*Assistant Examiner* — Brit E. Anbacht
(74) *Attorney, Agent, or Firm* — Foley & Lardner LLP

(57) ABSTRACT

A filter that is retained in a shell housing by the use of a snap connection. The filter includes an endplate having snap features that interact with a groove in an inner portion of the shell housing. The groove may extend 360 degrees around an inner circumference of the shell housing. Accordingly, when the shell is unthreaded from the head service (e.g., during a filter replacement service), the shell only needs to be displaced the length of the inner radial seal interface between the shell and the head, not the entire length of the filter media thereby minimizing the stroke length needed to service the filter assembly.

15 Claims, 4 Drawing Sheets

Related U.S. Application Data

(60) Provisional application No. 61/975,063, filed on Apr. 4, 2014.

(56) References Cited

U.S. PATENT DOCUMENTS

| | | | |
|---|---|---|---|
| 5,069,786 A | 12/1991 | Pulek | |
| 5,490,930 A * | 2/1996 | Krull | B01D 27/08 210/443 |
| 5,548,893 A * | 8/1996 | Koelfgen | B01D 29/15 29/888.011 |
| 5,556,542 A | 9/1996 | Berman et al. | |
| 5,589,060 A | 12/1996 | Gebert et al. | |
| 5,753,117 A | 5/1998 | Jiang | |
| 5,855,772 A | 1/1999 | Miller et al. | |
| 5,947,462 A * | 9/1999 | Roussel | B01D 35/30 210/232 |
| 5,996,810 A * | 12/1999 | Bounnakhom | B01D 27/08 210/443 |
| 6,402,798 B1 * | 6/2002 | Kal | B01D 35/30 220/293 |
| 7,163,237 B2 | 1/2007 | Niermeyer et al. | |
| 7,556,155 B2 * | 7/2009 | Harder | B01D 27/005 210/445 |
| 8,147,691 B2 | 4/2012 | Krull et al. | |
| 9,314,724 B2 * | 4/2016 | Girondi | B01D 46/2411 |
| 9,447,758 B2 * | 9/2016 | Girondi | B01D 29/21 |
| 10,046,263 B2 | 8/2018 | Smith et al. | |
| 10,493,385 B2 * | 12/2019 | Glazewski | B01D 27/08 |
| 2003/0226790 A1 | 12/2003 | Brown et al. | |
| 2005/0000886 A1 * | 1/2005 | Reynolds | B01D 35/30 210/450 |
| 2006/0157403 A1 | 7/2006 | Harder et al. | |
| 2010/0200492 A1 * | 8/2010 | Hussain | B01D 27/005 210/444 |
| 2010/0294707 A1 | 11/2010 | Abdalla et al. | |
| 2011/0296999 A1 | 12/2011 | Foerster et al. | |
| 2012/0205300 A1 | 8/2012 | Piva et al. | |
| 2012/0223001 A1 * | 9/2012 | Beard | B01D 29/925 210/232 |
| 2012/0279911 A1 | 11/2012 | Cofini | |
| 2014/0124054 A1 * | 5/2014 | Yamase | B01D 36/006 137/375 |
| 2014/0150388 A1 * | 6/2014 | Girondi | B01D 29/13 55/504 |
| 2015/0090653 A1 * | 4/2015 | Kotale | B01D 35/30 210/236 |
| 2016/0271533 A1 | 9/2016 | Honermann et al. | |
| 2017/0335806 A1 * | 11/2017 | Kuemmerling | F02M 35/0203 |
| 2018/0333663 A1 * | 11/2018 | Vogt | B01D 35/005 |
| 2020/0061503 A1 * | 2/2020 | Page | B01D 46/125 |
| 2021/0138373 A1 * | 5/2021 | Surdick | B01D 35/30 |

FOREIGN PATENT DOCUMENTS

| | | |
|---|---|---|
| EP | 0 811 411 | 12/1997 |
| EP | 1 119 403 | 8/2001 |
| WO | WO-2013/017921 | 2/2013 |

OTHER PUBLICATIONS

International Search Report and Written Opinion Issued for PCT Application No. PCT/U.S. 2015/023086, dated Jun. 25, 2015, 8 pages.

Second Office Action issued for Chinese Patent Application No. 201580016537X, and English Language Translation, dated Jun. 6, 2018, 24 pages.

* cited by examiner

SNAP IN PLACE NATURAL GAS FILTER

CROSS-REFERENCE TO RELATED APPLICATIONS

This application is continuation of U.S. patent application Ser. No. 15/301,220, filed on Sep. 30, 2016, which is the U.S. national stage application claiming the benefit of International Application No. PCT/US2015/023086, filed on Mar. 27, 2015, which claims priority to U.S. Patent Provisional Application No. 61/975,063, entitled "SNAP IN PLACE NATURAL GAS FILTER," filed on Apr. 4, 2014, The contents of all of the above applications are herein incorporated by reference in their entirety and for all purposes.

TECHNICAL FIELD

The present application relates to filtration systems. More particularly, the present application relates to a replaceable filter cartridge having a snap connection for a natural gas system.

BACKGROUND

Natural gas filters are generally provided along a natural gas line (e.g., a pipe, a hose, a line, etc., that provides natural gas to a device such as an internal combustion engine) and filter liquid and solid contaminants from a flow of natural gas. In a typical cylindrical filter assembly, a cylindrical filter cartridge is provided in a cylindrical shell housing. The cylindrical shell housing may be threaded onto a head in the natural gas line. The head delivers an unfiltered natural gas flow to a first side of the filter (i.e., a "dirty side" of the filter) where it is passed through the filter element and exits a second side of the filter (i.e., a "clean side" of the filter). The filter may be a coalescing filter. The filtered natural gas then flows away from the filter element and through the head such that filtered natural gas is provided to a destination by the natural gas line. Separated contaminant, such as water, dust, and/or oil, can be removed from the shell housing through an exit.

During servicing operations on the filter assembly, such as filter cartridge removal and installation during a filter cartridge replacement service, the threaded shell housing is removed from the filter head of the natural gas line. In some situations, the seal between the filter cartridge and the head causes the filter cartridge to remain attached to the head as the shell housing is being removed. This leads to an increased amount of space required to remove the shell housing from the head because the shell housing has to clear the filter cartridge in addition to the threads securing the shell housing on the head.

SUMMARY

One exemplary embodiments relate to a filter assembly. The filter assembly includes a shell housing having an internally threaded portion adjacent an open end of the shell housing and a groove positioned below the internally threaded portion, the shell housing configured to be threaded onto a head. The filter assembly further includes a filter cartridge removably received within the shell housing, the filter cartridge having a filter media positioned between a top endplate and a bottom endplate, a bottom endplate, and a filter media positioned there between, the top endplate including a flexible tab configured to form a snap connection with the groove such that the filter cartridge is retained in the shell housing.

Another exemplary embodiment relates to a filter cartridge. The filter cartridge includes a top endplate, a bottom endplate, and a filter media positioned between the top endplate and the bottom endplate. The filter cartridge further includes a flexible tab. The flexible tab is configured to form a snap connection with a groove of a shell housing when the filter cartridge is installed in the shell housing.

These and other features, together with the organization and manner of operation thereof, will become apparent from the following detailed description when taken in conjunction with the accompanying drawings, wherein like elements have like numerals throughout the several drawings described below.

DETAILED DESCRIPTION OF THE VARIOUS EMBODIMENTS

Referring to the figures generally, various embodiments disclosed herein relate to a filter that is retained in the shell housing by the use of a snap connection. The filter includes an endplate having snap features that interact with a groove in an inner portion of the shell housing. The groove may extend 360 degrees around an inner circumference of the shell housing. Accordingly, when the shell is unthreaded from the head for service (e.g., during a filter replacement service), the shell only needs to be displaced the length of the inner radial seal interface between the shell and the head, not the entire length of the filter media thereby minimizing the stroke length needed to service the filter assembly. The filter may be a gaseous or liquid filter. In some arrangements, the filter is a natural gas filter, and more particularly a natural gas coalescing filter.

Figure 1:
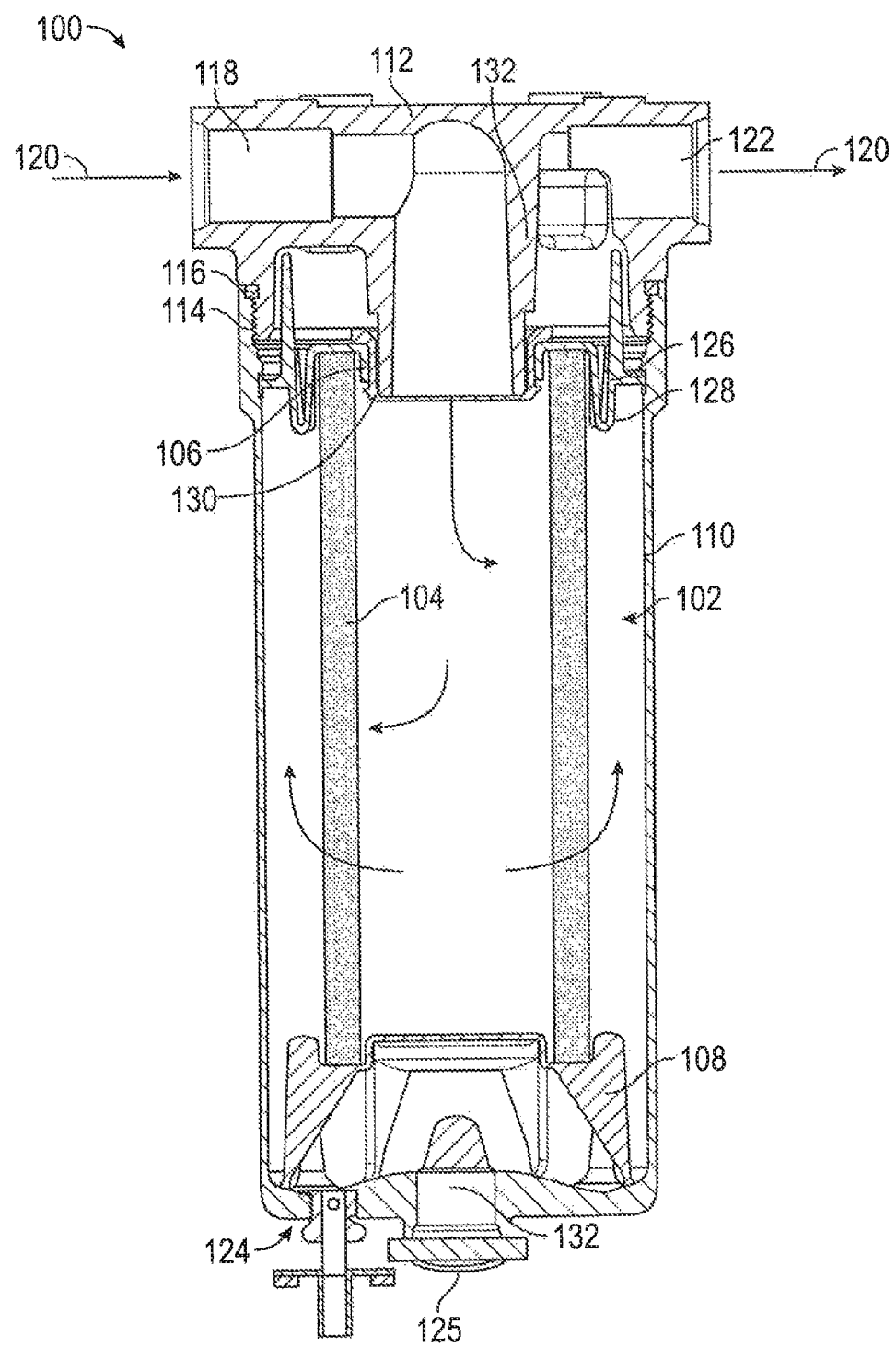
FIG. 1 is a cross-sectional view of an installed filter assembly according to an exemplary embodiment.

Referring to FIG. 1 a cross-sectional view of a filter assembly 100 in an installed position is shown according to an exemplary embodiment. The filter assembly 100 includes a filter cartridge 102 having filter media 104 positioned between a top endplate 106 and a bottom endplate 108. The top endplate 106 includes an opening to receive unfiltered natural gas. The bottom endplate 108 is closed and generally seals the inside of the filter media 104 (i.e., the dirty side) from the outside of the filter media 104 (i.e., the clean side). The filter cartridge 102 is surrounded by a shell housing 110. The shell housing 110 attaches to a head 112 through a threaded connection 114. A seal 116 is positioned between the shell housing 110 and the head 112. The head 112 includes an inlet 118 that receives a flow of natural gas 120 to be filtered and an outlet 122 that outputs a flow of natural gas 120. The shell housing 110 also includes a drain valve 124 to eject separated contaminants (e.g., coalesced and collected water, dust, oil, etc.) from the shell housing 110. In some arrangements, the drain valve 124 includes an integrated liquid sensor. In further arrangements, the shell housing includes a sight glass 125. The sight glass 125 may be integrated into the drain valve 124 or positioned at a bottom of the shell housing 110 (e.g., as shown in FIG. 1). In arrangements where the sight glass 125 is not integrated into the drain valve 124, the sight glass may be positioned at an area of the shell housing 110 spaced from the drain valve 124. The sight glass 125 may be a threaded insert secured to the shell housing 110 via a threaded connection. The sight glass 125 is a clear insert that allows a user to look into the shell housing 110 without removing the shell housing 110. The sight glass 125 may be comprised of transparent or substantially transparent glass, acrylic, plastic, or another suitable material. The sight glass 125 allows an operator or service technician to view the inside of the shell housing 110 to determine if there is liquid buildup within the shell housing 110. The sight glass 125 therefore allows the technician or operator to determine the optimal time to open and close the drain valve 124 and to minimize leakage of the fluid being filtered (i.e., fugitive emissions) out of the shell housing 110. The shell housing 110 includes an opening 132 in the center of the bottom of the shell housing 110. The opening 132 may be a port connection for a liquid level sensor, a sight glass insert, or a plug (e.g., if a liquid level sensor or sight glass insert is not needed). The shell housing 110 may be formed through an impact extrusion process that allows for use in higher pressure systems than a traditional spin-on filter shell housing.

During installation of the filter cartridge 102, the filter cartridge 102 is inserted into the shell housing 110. The top endplate 106 includes at least two tabs 126 that are received in a groove 128 of the shell housing 110. The groove 128 extends a full 360 degrees around the inner circumference of the shell housing, which eliminates the need for an orientation requirement during installation of the filter cartridge 102 into the shell housing 110. The tabs 126 and the groove 128 interact to form a snap connection between the filter cartridge 102 and the shell housing 110, the details of which are described below with respect to FIGS. 2-5. After insertion of the filter cartridge 102 in the shell housing 110, the shell housing is secured to the head 112 through the threaded connection 114 between the shell housing 110 and the head 112. The top endplate 106 includes a seal 130 that forms a seal between the top endplate 106 and a pipe 132 of the head 112. During removal of the filter cartridge 102, the shell housing 110 is unscrewed from the head 112. The filter cartridge 102 remains within the shell housing 110 because the tabs 126 and the groove 128 form a snap connection between the filter cartridge 102 and the shell housing 110. Accordingly, the shell housing 110 only needs to be displaced the distance of the threaded connection 114 to effect removal of the shell housing 110 from the head 112 because the risk that the filter cartridge 102 remains attached to the pipe 132 is eliminated.

Figure 2:
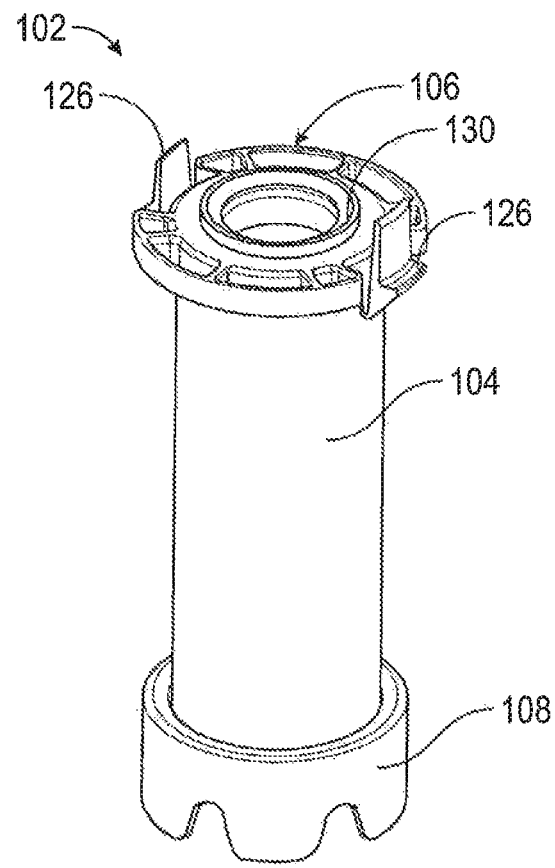
FIG. 2 is a perspective view of the filter cartridge of FIG. 1.

Referring to FIG. 2, a perspective view of the filter cartridge 102 is shown. The filter cartridge 102 is generally cylindrical in shape. The tabs 126 are located on opposing sides of the top endplate 106. The tabs 126 are hinged at a bottom side of the endplate 106 through a bottom hinge. The use of two opposing tabs 126 allow a service technician to use one hand to remove the filter cartridge 102 from the shell housing 110 by squeezing the opposing tabs 126 between the thumb and fingers of the technician's hand.

Figure 3:
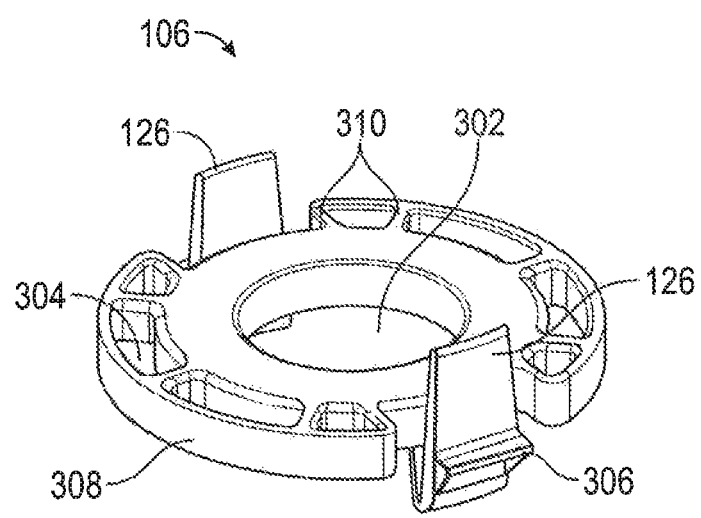
FIG. 3 is a perspective view of the upper endplate of the filter cartridge of FIG. 2.

Referring to FIG. 3, a perspective view of the top endplate 106 is shown. As shown in FIG. 3, the seal 130 is removed from the top endplate 106, The top endplate 106 includes a central opening 302. The central opening 302 receives the seal 130 and receives the pipe 132 when the filter cartridge is in the installed position. The central opening 302 receives natural gas to be filtered. The natural gas is filtered through the filter media 104. Filtered natural gas exits the filter cartridge 102 through side openings 304 in the top endplate 106, where the filtered natural gas returns to the head 112. Additionally, the tabs 126 each include a barb 306. The barbs 306 are received in the groove 128 to form the snap connection between the filter cartridge 102 and the shell housing 110. An outer diameter 308 of the top endplate is supported by radial ribs 310. The radial ribs 310 define the side openings 304. The outer diameter 308 may rest against an inner surface of the shell housing 110 to help stabilize the filter cartridge 102 when the filter cartridge 102 is received within the shell housing 110.

Figure 4:
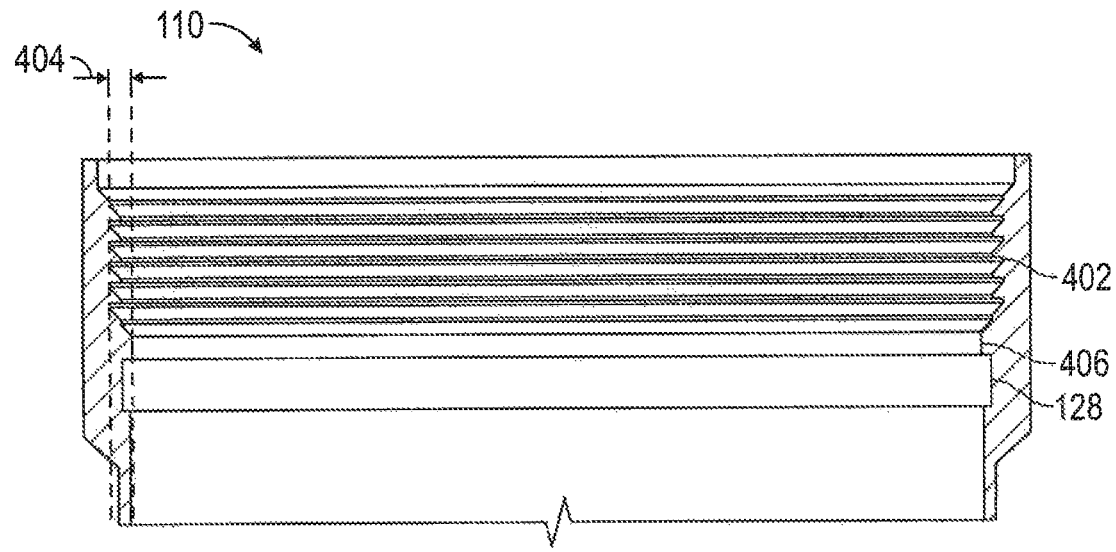
FIG. 4 is a cross sectional view of a connecting portion of the shell housing of FIG. 1.

Referring to FIG. 4, a cross-sectional view of the shell housing 110 is shown. The shell housing 110 includes the groove 128 and internal threading 402 positioned over an internal circumference of the shell housing 110. The internal threading 402 extends over a top portion of the shell housing 110 adjacent to the open end of the shell housing 110. The internal threading 402 is positioned above the groove 128. The internal threading 402 forms half of the threaded connection 114 (as shown in FIG. 1). The thread minor diameter of the internal threading 402 of the shell housing 110 is larger than the inner diameter of the inside of the shell housing 110 by distance 404. The thread minor diameter of the shell housing 110 is also larger than the diameter of the groove 128 by a distance less than distance 404. The larger diameter of the internal threading 402 allows the filter cartridge 102 to be inserted into and removed from the shell housing 110 without the barbs 306 snagging on the internal threading 402. Additionally, the shell housing 110 includes a shell lead-in ramp 406. The shell lead-in ramp 406 interfaces with a similar feature on the tabs 126 (as discussed below with respect to FIG. 5) to allow for easy installation of the filter cartridge 102 into the shell housing 110.

Figure 5:
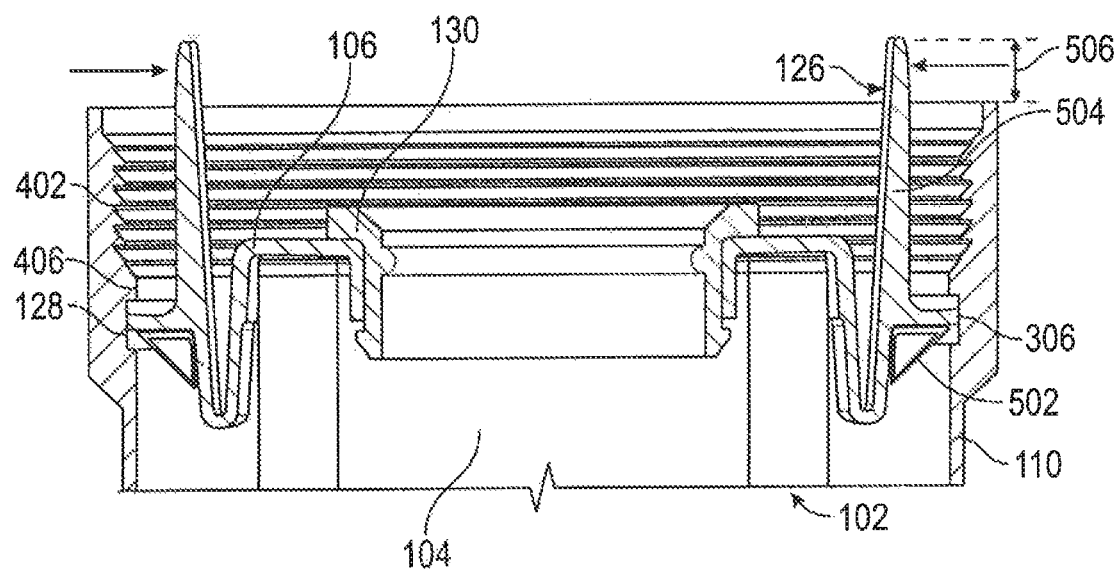
FIG. 5 is a cross sectional view of the filter cartridge of FIG. 2 connected to the shell housing of FIG. 4.

Referring to FIG. 5, a cross sectional view of the filter cartridge 102 installed in the shell housing 110 is shown. When the filter cartridge 102 is installed in the shell housing 110, the barbs 306 of each tab 126 are received in the groove 128 of the shell housing 110. Each tab 126 includes a tab lead-in ramp 502. The tab lead-in ramps 502 interface with the shell lead-in ramp 406 during installation to displace the barbs 306 for insertion into the groove 128. Each tab 126 also includes a lever arm 504. The lever arms 504 extend above a top of the shell housing 110 by a distance 506 to provide a technician gripping surface for removal and installation of the filter cartridge 102. The outside surface of the lever arms 504 are close in proximity to the inner diameter of the filter head 112 such that over-flexing of the lever arms 504 is prevented (i.e., the lever arms abut the top endplate 106 prior to being over-flexed). The prevention of over-flexing helps to prevent breaking of the lever arms 504 during removal of the shell housing 110 from the head 112. If the lever arms 504 break during removal, the filter cartridge 102 may be stuck in the shell housing 110 and/or debris from the broken lever arms 504 may enter the shell and remain in the shell after a service event (e.g., after filter cartridge 102 replacement).

Figure 6:
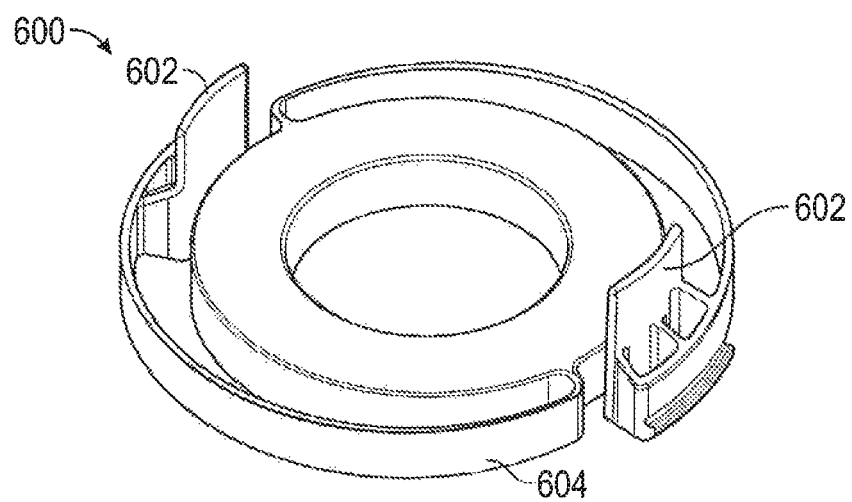
FIGS. 6-8 are perspective views of alternative arrangements of upper endplates of a filter cartridge according to exemplary embodiments.
Figure 7:
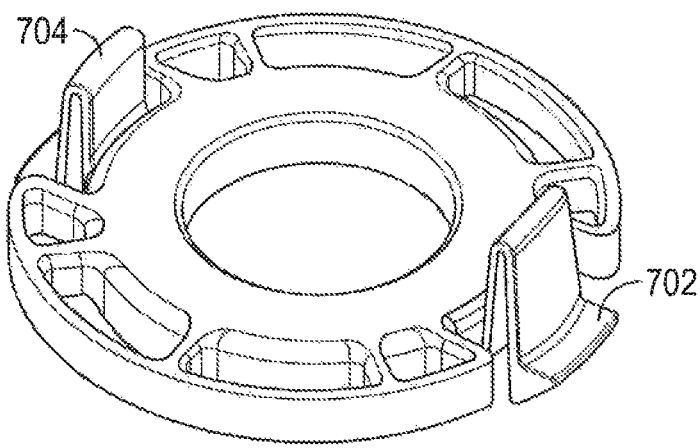
Figure 8:
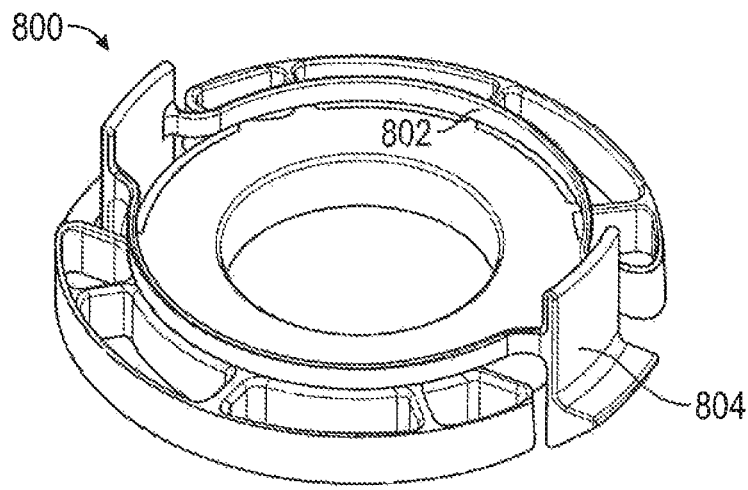

Referring to FIGS. 6-8 perspective views of alternative arrangements of upper endplates for the filter cartridge 102 are shown according to exemplary embodiments. Referring to FIG. 6, a top endplate 600 having tabs 602 is shown. The tabs 602 are similar to the tabs 126 of the endplate 106. The tabs 602 differ from the tabs 126 in that the hinge is a spiral hinge 604. Referring to FIG. 7, a top endplate 700 having tabs 702 is shown. The tabs 702 are similar to the tabs 126 of the endplate 106. The tabs 702 differ from the tabs 126 in that the hinge is a top hinge 704. Referring to FIG. 8, a top endplate 800 is shown. The top endplate 800 includes a hoop snap 802 having tabs 804. When the filter cartridge 102 is in an installed position within the shell housing 110, the hoop snap 802 is inserted until the tabs 804 interface with the groove 128 of the shell housing 110. The hoop snap 802 abuts the top endplate 802 to prevent removal of the filter cartridge 102.

The above described filter is described as being a natural gas coalescing filter. However, the same concepts may be applied to other types of filters that do not use a traditional spin-on installation and removal, such as oil filters, air filters, water filters, fuel filters, hydraulic fluid filters, and the like.

It should be noted that any use of the term "exemplary" herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A filter assembly comprising:
a shell housing having an internally threaded portion and a groove, the internally threaded portion being adjacent an open end of the shell housing and positioned between the groove and the open end of the shell housing, the shell housing configured to be threaded onto a head; and
a filter cartridge removably received within the shell housing, the filter cartridge having a filter media positioned between a top endplate and a bottom endplate, the top endplate comprising a flexible tab configured to form a snap connection with the groove such that the filter cartridge is retained in the shell housing, wherein the flexible tab is connected to the top endplate by a top hinge, the flexible tab comprising:
a first end coupled to the top endplate,
the top hinge located axially upwards of the first end,
a second end located proximate to, and radially outwards of the first end, and
a tab lead-in ramp extending radially outwards from the second end, a top surface of the tab lead-in ramp located below a top surface of the top endplate and configured to be disposed within the groove when the filter cartridge is installed in the shell housing.

2. The filter assembly of claim 1, wherein the shell housing comprises a shell lead-in ramp positioned between the internally threaded portion and the groove.

3. The filter assembly of claim 2, wherein the tab lead-in ramp is configured to interface with the shell lead-in ramp during installation of the filter cartridge into the shell housing such that the tab lead-in ramp and the shell lead-in ramp displace a barb of the flexible tab for insertion into the groove.

4. The filter assembly of claim 1, wherein the groove extends a full 360 degrees around an inner circumference of the shell housing.

5. The filter assembly of claim 1, wherein the flexible tab is a first flexible tab, and wherein the top endplate comprises a second flexible tab configured to, in cooperation with the first flexible tab, form the snap connection with the groove.

6. The filter assembly of claim 1, wherein the top endplate comprises a central opening and a plurality of side openings at least partially surrounding the central opening.

7. The filter assembly of claim 1, wherein the top endplate comprises a seal member that is configured to seal the top endplate and the head together.

8. The filter assembly of claim 1, wherein a thread minor diameter of the internally threaded portion is larger than a diameter of an inside of the shell housing.

9. The filter assembly of claim 8, wherein the thread minor diameter of the internally threaded portion is larger than a groove diameter of the groove.

10. The filter assembly of claim 1, wherein the shell housing comprises a sight glass configured to allow a user to look into the shell housing.

11. A filter cartridge, comprising:
a top endplate;
a bottom endplate;
a filter media positioned between the top endplate and the bottom endplate; and
a flexible tab configured to form a snap connection with a groove of a shell housing when the filter cartridge is installed in the shell housing, wherein the flexible tab is connected to the top endplate by a top hinge, the flexible tab comprising:

a first end coupled to the top endplate, the top hinge located axially upwards of the first end, a second end located proximate to, and radially outwards of the first end, and a tab lead-in ramp extending radially outwards from the second end, a top surface of the tab lead-in ramp located below a top surface of the top endplate and configured to be disposed within the groove when the filter cartridge is installed in the shell housing.

12. The filter cartridge of claim 11, wherein the tab lead-in ramp is configured to interface with a shell lead-in ramp during installation of the filter cartridge into the shell housing such that the tab lead-in ramp and the shell lead-in ramp displace a barb of the flexible tab for insertion into the groove.

13. The filter cartridge of claim 11, wherein the flexible tab comprises a barb that is configured to be received within the groove.

14. The filter cartridge of claim 11, wherein the flexible tab is a first flexible tab, and wherein filter cartridge further comprises a second flexible tab configured to, in cooperation with the first flexible tab, form the snap connection with the groove of the shell housing when the filter cartridge is installed in the shell housing.

15. The filter cartridge of claim 11, wherein the top endplate comprises a seal member that is configured to seal the top endplate and a filter head together.

* * * * *